United States Patent
Peglowski et al.

(10) Patent No.: US 11,168,749 B2
(45) Date of Patent: Nov. 9, 2021

(54) SECTOR CLUTCH

(71) Applicant: BorgWarner Inc., Auburn Hills, MI (US)

(72) Inventors: Brett Peglowski, Oakland, MI (US); Calahan Campton, Royal Oak, MI (US); Michael W. Campbell, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 45 days.

(21) Appl. No.: 16/348,902

(22) PCT Filed: Nov. 8, 2017

(86) PCT No.: PCT/US2017/060493
§ 371 (c)(1),
(2) Date: May 10, 2019

(87) PCT Pub. No.: WO2018/089396
PCT Pub. Date: May 17, 2018

(65) Prior Publication Data
US 2019/0264760 A1  Aug. 29, 2019

Related U.S. Application Data

(60) Provisional application No. 62/420,330, filed on Nov. 10, 2016.

(51) Int. Cl.
*F16D 41/08* (2006.01)
*F16D 41/16* (2006.01)

(52) U.S. Cl.
CPC ............. *F16D 41/16* (2013.01); *F16D 41/08* (2013.01)

(58) Field of Classification Search
CPC .......... F16D 41/16; F16D 41/08; F16D 41/14; F16D 41/02; F16D 27/10; F16D 41/12
See application file for complete search history.

(56) References Cited

U.S. PATENT DOCUMENTS 10,100,883 B2 * 10/2018 Martin .................... F16D 23/00
2006/0185957 A1   8/2006 Kimes et al.
(Continued)

FOREIGN PATENT DOCUMENTS

WO   WO 2016-053642 A1   4/2016
WO   WO 2016-168070 A1   10/2016

OTHER PUBLICATIONS

International Search Report related to Application No. PCT/US2017/060493 dated Jan. 18, 2018.

*Primary Examiner* — David J Hlavka
(74) *Attorney, Agent, or Firm* — von Briesen & Roper, s.c.

(57) ABSTRACT

A clutch (10) for selectively preventing rotatory movement of a cogged gear (12) about an axis may include an actuator (20) and a pivotally moveable pawl (40) that is interactive with the cogged gear (12). A plunger (24) may be radially movable within and by the actuator (20). A pair of axially spaced sidewalls (16, 18) may include an opposed radially extending slot (52). A pawl pusher (50) may be radially movable between the plunger (24) and the pawl (40). The pawl pusher (50) may include a pair of axially extending wing portions (54, 56) that may be slidably supported in one of the opposed slots (52) to limit movement of the pawl pusher (50) to radial, only. Axial and/or circumferential force loads transmitted to the pawl pusher (50) by the pawl (40) may not be transferred to the radially movable plunger (24).

15 Claims, 6 Drawing Sheets

(56) References Cited

U.S. PATENT DOCUMENTS

| | | | |
|---|---|---|---|
| 2009/0266667 A1* | 10/2009 | Sarnie | F16D 41/12 |
| | | | 192/43.1 |
| 2013/0263684 A1 | 10/2013 | McCloy | |
| 2014/0102844 A1 | 4/2014 | Greene et al. | |
| 2014/0141923 A1 | 5/2014 | Forsyth | |
| 2015/0060222 A1 | 3/2015 | Showalter | |
| 2015/0204392 A1 | 7/2015 | Kimes | |
| 2016/0160941 A1* | 6/2016 | Green | F16D 41/12 |
| | | | 192/71 |
| 2017/0141923 A1* | 5/2017 | Zhang | H04L 9/3247 |
| 2018/0058518 A1* | 3/2018 | Uppal | F16D 25/12 |
| 2018/0100551 A1* | 4/2018 | Campton | F16D 28/00 |
| 2018/0112725 A1* | 4/2018 | Campton | F16D 41/16 |

* cited by examiner

SECTOR CLUTCH

TECHNICAL FIELD

The present disclosure relates to clutches, and more particularly to sector clutches having pawls employed for rotary control of cogged gears.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF ILLUSTRATED EMBODIMENTS

A sector clutch described herein is configured to control rotational movements of a part, such as a gear having a plurality of teeth, cogs, or detents. Unlike other clutches, a sector clutch is configured to engage a relatively limited angular range or sector of the 360° circumference of a rotating circular gear with which it interacts. Such clutch may function to control the gear with only a single actuator and a single pawl. The gear and pawl may each pivot about separate axes for selective engagement and disengagement of the gear to either permit or prevent rotational motion of the gear.

The pawl may be controlled by an actuator that may, in turn, move a plunger to engage the gear, as well as to disengage the pawl from the gear. The embodiments of the clutch shown and described herein may be used in a wide variety of applications that benefit from actuator control of gear movement. Although the clutch may be used to control movement of gears within vehicle transmissions, other applications involving selective control of rotational gear motion are also applicable.

Figure 1:
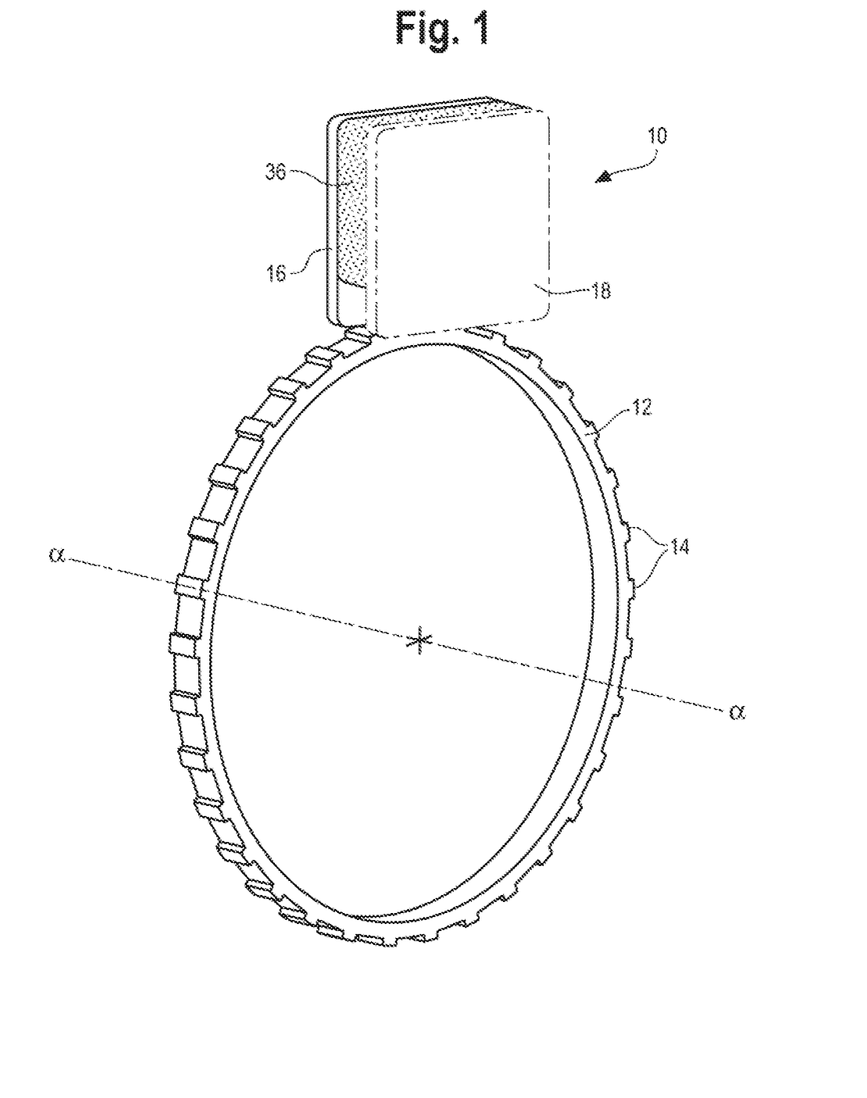
FIG. 1 is a perspective view of one embodiment of a sector clutch, shown interacting with a cogged gear, and including a pair of side plates configured to support an actuator constructed in accordance with one embodiment of this disclosure.

Referring now to FIG. 1, a first embodiment of a sector clutch 10 is shown spatially fixed relative to, and in engagement with, a cogged gear 12 oriented along a rotational axis a-a. In at least one embodiment, the sector clutch 10 is fixed in an interactive transmission part (not shown) that extends circumferentially about the cogged gear 12. A cogged gear, e.g. the cogged gear 12, is defined herein as a gear that includes at least one or more cogs 14. The sector clutch 10 includes a first side plate 16 (background) and a second side plate 18 (foreground), with the first and second side plates axially spaced apart as shown.

Figure 2:
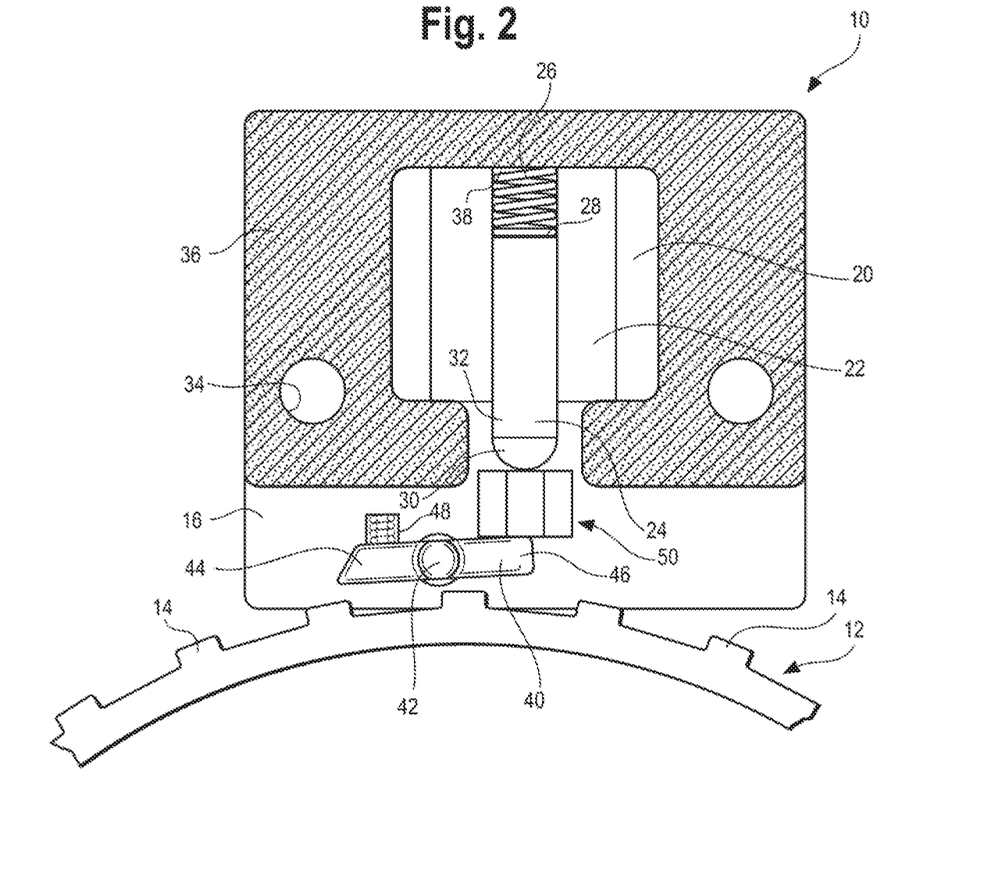
FIG. 2 is a partial side view of the same embodiment of the sector clutch of FIG. 1, with one of the side plates removed to reveal internal clutch structures positioned in an unlocked or free-wheeling mode relative to the cogged gear.

Referring now to FIG. 2, an actuator 20, shown here as an electric solenoid, although other power sources, such as hydraulic pressure, may be used to empower the actuator 20. The actuator includes an armature 22, and a plunger 24 configured to move reciprocally under selectively applied forces of either an electromagnetic field created by the armature or a plunger spring 26. For this purpose, the plunger spring 26 is trapped between a distal end 28 of the plunger 24 and an internal upper surface 38 of an actuator support block 36 secured between the first and second side plates 16, 18 via bolts (not shown) that extend through apertures 34. The actuator support block 36 may be formed of a non-conductive material or, if desired for some configurations to accommodate flux flow to the solenoid for example, may alternatively be formed of a conductive material, at least in part. Ideally, the support block 36 would be formed of a rigid material, such as a hard polymer, sufficient to minimize any distortions created in a relatively harsh environment of high thermal loads and alternating mechanical forces that occur within automotive transmissions, for example.

Continuing reference to FIG. 2, a boss 30 is fixed to a proximal end 32 of the plunger 24. The boss 30 is configured to interact at least indirectly with a pawl 40, causing the pawl 40 to pivot about axially extending support bosses 42. Such interaction causes the toe 44 of the pawl 40 to move whenever the plunger 24 interacts with the heel 46 of the pawl 40. For return movement, those skilled in the art will appreciate that a pawl spring 48 imparts a relatively small force against the toe 44 of the pawl, compared to the force of the interactive spring 28, which pushes against the distal end 28 of the plunger 24. In the disclosed embodiment, whenever the armature 22 is electrically de-energized, the plunger spring 26 will be effective to force the plunger downwardly, overcoming an opposing force of the pawl spring 48, and causing the clutch to move into a freewheel mode, as shown. In the latter mode, the toe 44 is held out of engagement with, and hence interaction with, the cogs 14. As such, in a failsafe mode, designed herein as a mode in which no power is supplied to the armature 22, the clutch will move into and remain in the freewheel mode depicted in FIG. 2. Although configured as described, the failsafe mode may alternatively be modified to accommodate a locked mode, instead.

Figure 3:
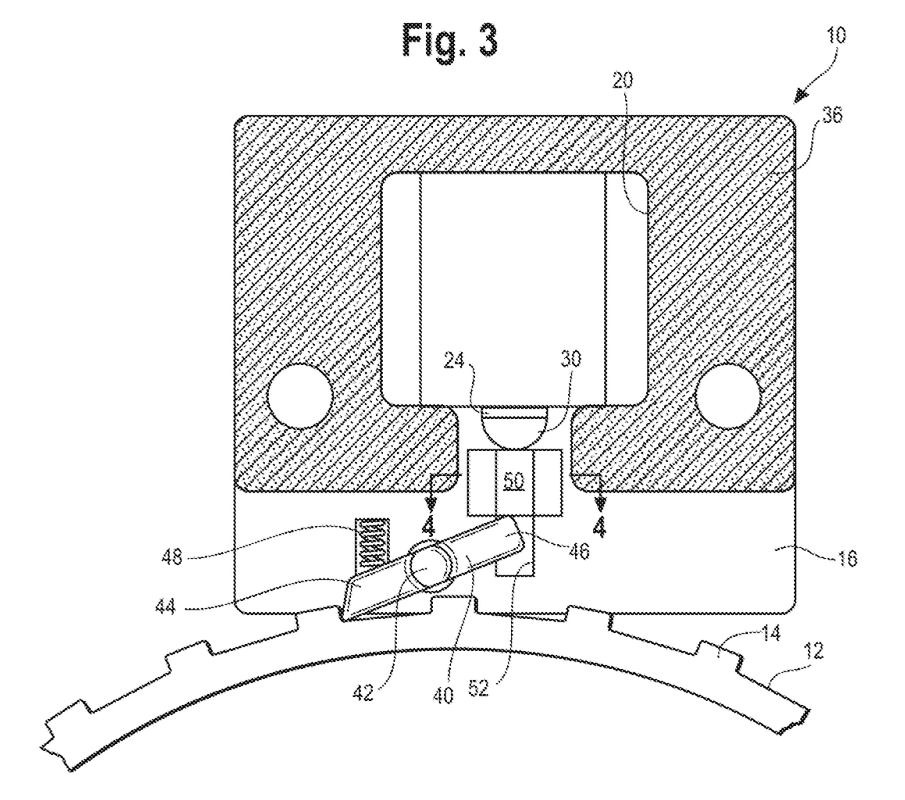
FIG. 3 is a similar partial side view of the same embodiment of the sector clutch of FIGS. 1 and 2, but shown positioned in a locked mode relative to the cogged gear.

Referring now to FIG. 3, the actuator 20 is shown in an energized state, and the sector clutch 10 is shown to be in a locked mode, wherein the toe 44 of the pawl 40 is urged into engagement with a cog 14 of the gear 12 by force of the pawl spring 48. In an energized state, an electromagnetic field produced by the armature 22 is effective to pull the plunger 24 upwardly into the interior of the armature. The armature is configured to have strength sufficient to overcome the force of the plunger spring 26.

Figure 4:
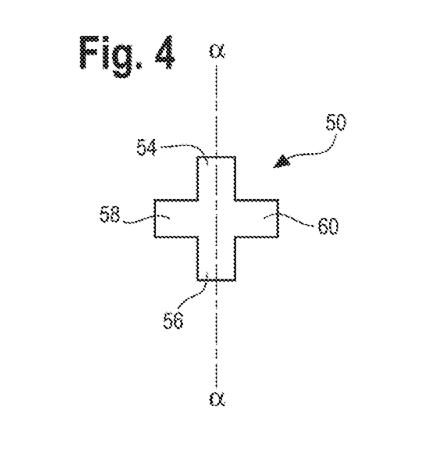
FIG. 4 is a cross-section of an internal part of the sector clutch, taken along lines 4-4 of FIG. 3, the part constructed in accordance with one disclosed embodiment.

In the disclosed embodiment of the sector clutch 10 of FIGS. 2 and 3, a pawl pusher 50 is employed to avoid transfer of non-radial loads on the plunger 24 from the pawl 40. For this purpose, the boss 30, fixed to the proximal end of the plunger 24, is configured to interact only directly with the pawl pusher 50. Referring now also to FIG. 4, a cross-section of the pawl pusher, viewed radially along lines 4-4 of FIG. 3, reveals a pair of first and second opposed wing portions 54, 56 that transit radially within radially oriented slots 52 of the side plates 16, 18 (only shown in the first side plate 16 in FIG. 3). Opposed wing portions 58 and 60 extend circumferentially between the first and second side plates 16, 18, or orthogonally with respect to the first and second wing portions 54, 56, thus forming a four-bar cross-section in the pawl pusher 50, as viewed along its radial orientation (FIG. 4). The four radially spaced wing portions 54, 56, 58, and 60 of the pawl pusher 50 cooperatively assure that no side loads imparted by the pawl 40 can be transferred to the plunger 24. Since the wing portions of the floating pawl pusher 50 are limited to only radial movements, including those within the slots 52 of the first and second side plates 16, 18, neither the boss 30 nor the plunger 24 can be subjected to non-radial forces from the pawl 40.

Figure 5:
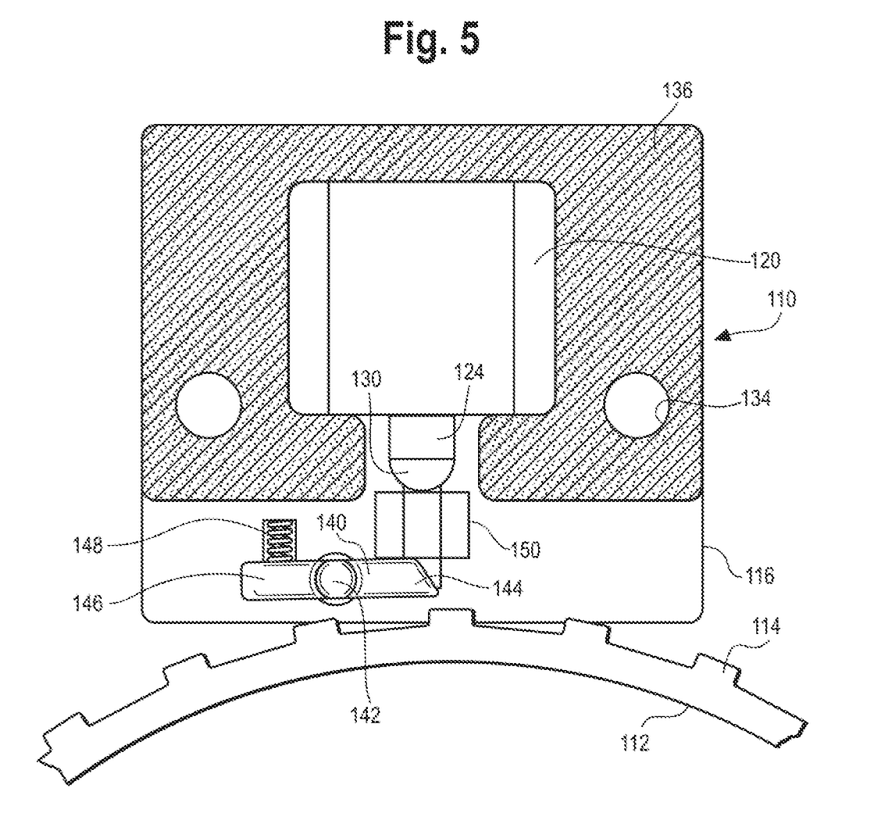
FIG. 5 is a partial side view of an alternate embodiment of the sector clutch, also with one side plate removed to reveal internal clutch structures positioned in a free-wheeling mode relative to the cogged gear.

Referring now to FIG. 5, a second embodiment of a sector clutch 110 is depicted. In descriptions of additional embodiments herein provided, all references are analogous to those of earlier described embodiments. Thus, as each new embodiment is introduced, elements similar to those of previously introduced embodiments will share similarly numbered relationships, though distinguished by some multiple of one hundred. For example, the pawl pusher 50 of the first embodiment will become a pawl pusher 150 in the second embodiment, etc.

Thus, in the second embodiment of the sector clutch 110, a pawl pusher 150 bears against a toe 144, instead of a heel 146. Also in this second embodiment, the pawl spring 148 urges against the heel 146 of the pawl 140, instead of the toe 144. In FIG. 5, the clutch is shown in a freewheel mode, with an actuator 120 having been de-energized, similarly to the fail-safe mode described with respect to the first described embodiment of FIG. 2. Those skilled in the art will appreciate that, apart from the described exception, the sector clutch 110 is analogous to the first embodiment (FIG. 2) in all respects.

Figure 6:
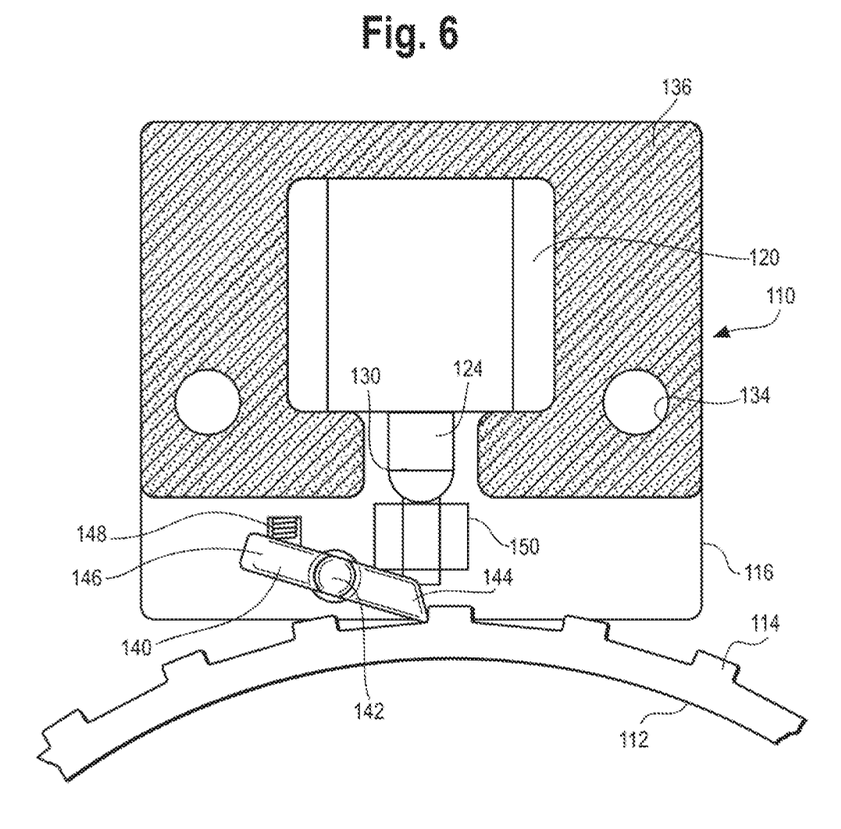
FIG. 6 depicts a similar partial side view of the same embodiment of the sector clutch of FIG. 5, but shown positioned in a locked mode relative to the cogged gear.

In FIG. 6, the second embodiment of the sector clutch 110 is depicted in a locked mode, wherein the toe 144 is shown engaged with a cog 114 of a gear 112. In this mode, the armature 120 is energized, and thus the force of the plunger spring (not shown) is effective to overcome the lesser pawl spring force 148, analogous to the state of the clutch as described relative to first embodiment.

Figure 7:
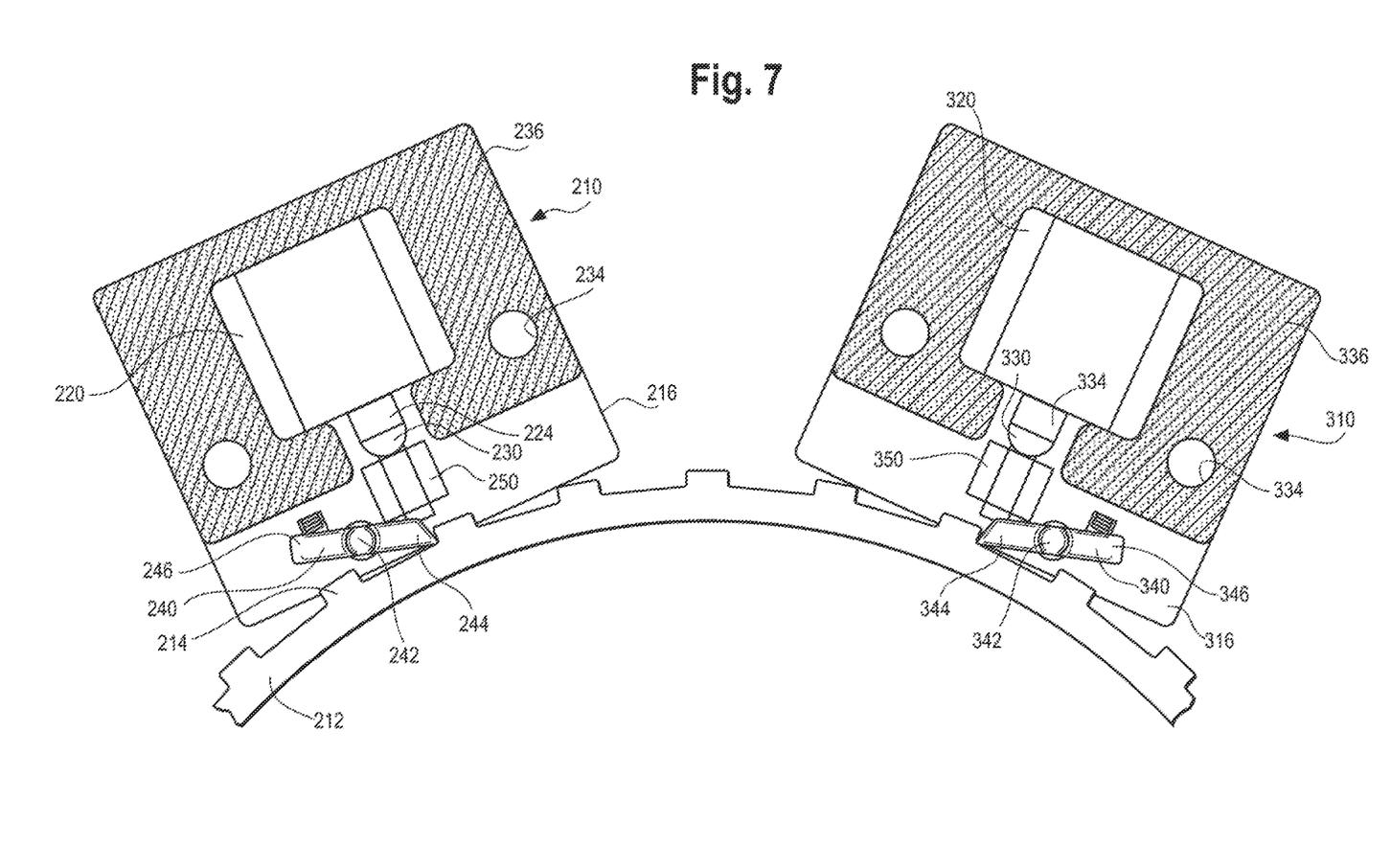
FIG. 7 depicts a pair of sector clutches, situated in an opposed orientation to provide additional functionality in yet another embodiment of this disclosure.

Finally, referring to FIG. 7, a dual sector clutch arrangement provides a third embodiment offering additional functionality. Thus, sector clutches 210 and 310, shown situated angularly adjacent one another for joint interaction with the cogged gear 212, provide additional operational modes beyond one-way freewheel and one-way locked modes provided by the first two sector clutch embodiments. The dual sector clutch arrangement offers four distinct states or modes: 1) unimpeded rotation; 2) fully-locked rotation; 3) rotation only in a clockwise direction; and 4) rotation only in a counterclockwise direction. The respective dual actuators 220 and 320 of clutches 210 and 310 may be selectively controlled to permit the cogged gear 212 to be selectively rotated to achieve each of the four states, as those skilled in the art will readily appreciate.

As one example, the clutch 210 may be a transmission clutch, configured to actuate a primary pawl 240, associated with only forward movements of a vehicle, while the clutch 310 may actuate a secondary pawl, e.g. pawl 340, to manage only reverse movements of such vehicle.

It is to be understood that the foregoing is a description of only a few embodiments of the disclosure. However, the disclosure is not limited to the particular embodiment(s) disclosed. For example, it is conceivable that other embodiment configurations may utilize only axial movements of the pawl pusher, although only radial movement of the pawl pusher 50, 150, 250, 350 has been shown and described herein. Moreover, statements contained in the description relate only to particular embodiments, and are not to be construed as limitations on scope of the disclosure or on definitions of terms used in the claims, except where a term or phrase may have been expressly defined. Various other embodiments, changes, and modifications to the disclosed embodiment(s) will be apparent to those skilled in the art, and are intended to fall within the spirit and scope of the appended claims.

As used in this disclosure, various terms "e.g.," "for example," "for instance," "such as," and "like," and verbs "comprising," "having," "including," and their other verb forms, when used in conjunction with a listing of one or more components or other items, are to be construed as open-ended, meaning that the listing is not to be considered as excluding other or additional components or items. All terms are to be given their broadest reasonable meanings unless used in contexts that clearly require different interpretations.

The invention claimed is:

1. A clutch for selectively preventing rotatory movement of a cogged gear about an axis, the clutch comprising:
   an actuator;
   a pivotally movable pawl, the pawl being interactive with the cogged gear;
   a plunger radially movable within and by the actuator, the plunger oriented orthogonally relative to the axis to control pawl movement;
   a pair of axially spaced sidewalls, each sidewall including an opposed radially extending slot;
   a pawl pusher radially movable between the plunger and the pawl, the pawl pusher including a pair of axially extending wing portions, each wing portion slidably supported in one of the opposed slots to limit movement of the pawl pusher to radial, only;
   wherein axial and/or circumferential force loads transmitted to the pawl pusher member by the pawl are not transferred to the radially movable plunger.

2. The clutch of claim 1, wherein the plunger has radially spaced proximal and distal ends with a boss situated at its proximal end, wherein the boss directly contacts and moves the pawl pusher member.

3. The clutch of claim 1, wherein the pawl pusher member has a four-bar cross-section.

4. The clutch of claim 1, wherein the pawl pusher member is configured to float radially between the boss and the pawl.

5. The clutch of claim 1, wherein the clutch is a sector clutch, and each pawl includes a heel and a toe.

6. The clutch of claim 1, further comprising a spring biased against a heel of the pawl, and wherein the pawl pusher biases the toe of the pawl.

7. The clutch of claim 1, further comprising a spring biased against a toe of the pawl, and wherein the pawl pusher biases the heel of the pawl.

8. A pawl pusher for a clutch configured to selectively prevent rotational movement of a gear, the pawl pusher comprising:
   a cross-shaped member adapted to be radially disposed between a control plunger of the clutch and a pivotal pawl of the clutch, wherein the member is limited to only radial movement within the clutch.

9. The pawl pusher of claim 8, wherein the control plunger has radially spaced proximal and distal ends with a boss situated at its proximal end, wherein the boss directly contacts and moves the pawl pusher member.

10. The pawl pusher of claim 8, further comprising a four-bar cross-section.

11. The pawl pusher of claim 8, further configured to float radially between the boss and the pawl.

12. The pawl pusher of claim 8, wherein the clutch is a sector clutch, and wherein each pawl includes a heel and a toe.

13. The pawl pusher of claim 8, wherein the clutch further comprises a spring biased against a heel of the pawl, and wherein the pawl pusher biases the toe of the pawl.

14. The pawl pusher of claim 8, wherein the clutch further comprises a spring biased against a toe of the pawl, and wherein the pawl pusher biases the heel of the pawl.

15. A method of making a sector clutch for selectively preventing rotary movement of a cogged gear about an axis; the method comprising the steps of:
   forming an actuator support block, and installing an actuator within the support block;
   forming a pair of axially spaced sidewalls, each having a slot oriented radially with respect to the axis;
   securing the sidewalls to the support block;
   forming a pivotally movable pawl to be interactive with cogs on the gear, the pawl having axial ends pivotally anchored in each sidewall;
   forming a radially movable plunger oriented orthogonally relative to the axis, the plunger being adapted to control pawl movement;
   securing the plunger to the actuator;
   forming a pawl pusher configured to float radially between the plunger and the pawl, with the pawl pusher including a pair of axially extending wing portions, each wing portion being slidably supported in one of the opposed slots to accommodate movement of the pawl pusher;
   wherein axial and/or circumferential force loads transmitted to the pawl pusher member by the pawl are not transferred to the radially movable plunger.

* * * * *